United States Patent [19]
Stanly et al.

[11] 3,881,467
[45] May 6, 1975

[54] HEART MONITORING SYSTEM
[75] Inventors: Albert Leven Stanly; Robert Judd Hromadka, both of Los Angeles, Calif.
[73] Assignee: Hycel, Inc., Houston, Tex.
[22] Filed: Nov. 9, 1973
[21] Appl. No.: 414,310

[52] U.S. Cl............................................. 128/2.06 A
[51] Int. Cl............................................. A61b 5/04
[58] Field of Search...... 128/2.05 P, 2.05 R, 2.05 T, 128/2.06 A, 2.06 F, 2.06 R

[56] References Cited
UNITED STATES PATENTS

| | | | |
|---|---|---|---|
| 3,518,983 | 7/1970 | Jorgensen | 128/2.06 A |
| 3,524,442 | 8/1970 | Horth | 128/2.06 A |
| 3,598,110 | 8/1971 | Gdmarle | 128/2.06 A |
| 3,618,593 | 11/1971 | Nachev et al. | 128/2.06 A |
| 3,633,569 | 1/1972 | Brayshaw et al. | 128/2.06 A |

*Primary Examiner*—William E. Kamm
*Attorney, Agent, or Firm*—Harry W. Barron; Timothy L. Burgess

[57] ABSTRACT

A heart monitoring system is disclosed which monitors a heartbeat to determine whether certain arrhythmias, such as extrasystoles, and high and low heartbeat rates, are occurring. The system is primarily composed of digital electronic logic and can be made portable. The logic compares the time intervals between R waves of the heartbeat to determine the occurrence of any arrhythmias. If an arrhythmia is detected, an alarm associated with the system is sounded to inform the patient to view a visual display of the particular problem.

16 Claims, 8 Drawing Figures

HEART MONITORING SYSTEM

This invention relates to a heart monitoring system and more particularly to a portable device which can measure the time interval between the R waves of a heart beat, analyze this information and provide readouts relating to the extrasystoles which occur during the heartbeat and further provide information relating to whether the heartbeat is above a predetermined maximum desirable level or below a second predetermined minimum desirable level.

More than 250,000 heart attack victims die each year without having reached the hospital. If all of these victims had been able to get to a hospital and receive proper coronary treatment, a substantial number of them would be alive today. The greatest single factor in these people not reaching a hospital on time to receive help is the apparent inability of the person to reach a decision of whether or not to call for help. One reason for this long decision time is the inability of the patient to properly monitor his heart rate, which, in turn, is due to the lack of equipment necessary to do this.

It has been found that at the onset of a heart attack the heartbeat contains a number of dangerous arrhythmias, or irregular beat signs, which if properly detected would give a good indication of an impending or recently occurring heart attack. These arrhythmias are usually of the type of a premature ventricular contraction, or extrasystole, or bradycardia, or a heart beat rate which is below a given value, such as 60 beats per minute, or a tachycardia, or heart beat rate greater than a given value, such as 100 beats per minute. Each of these three types of normally non-fatal arrhythmias give an indication of a possible impending ventricular fibrillation which is generally followed by death within a short time if not properly treated.

It should be noted that the above mentioned arrhythmias are directly related to the time interval between heartbeats. This interval can readily be determined by measuring the time between successive R waves of the heartbeat and thereafter processing this information to arrive at data indicating one or more of these symptoms. In order for a device to be practical it must be portable and inexpensive so that those patients who are likely heart attack victims can wear one at all times. With the advent of modern digital electronics, it has become feasible to build a heart monitor system at a reasonable cost which would be approximately the size of a large wrist watch. The heart attack prone patient could then wear this device as a watch twenty-four hours a day and maintain a constant monitor over his heartbeat rate.

In accordance witn one aspect of this invention there is provided a heart monitoring system which includes means for providing a signal indicative of the occurrence of each heartbeat, whereby a normal or an abnormal interval exists between successive heartbeats. There is further provided comparing means for comparing the last occurring interval with the last occurring normal interval to determine whether the last occurring interval is at least a certain percentage of the last occurring normal interval. The last occurring interval will become the last occurring normal interval for subsequent comparisons only in the event it is at least that certain percentage. A signal will be provided in the event that the last occurring interval is not the certain percentage.

In accordance with a second aspect of this invention there is provided a method for detecting irregularities in a heartbeat which includes the steps of storing a value related to the normal time interval between heartbeats and obtaining a value related to the time between the last two heartbeats. The method further includes the steps of comparing the stored and obtained values to determine whether the time between the last two heartbeats is at least a certain percentage of the normal time interval and replacing the stored value with a value related to the obtained value in the event the time interval between the last two heartbeats is at least that certain percentage. A further step is maintaining the stored value until after the next two heartbeats have occurred in the event the interval between the last two heartbeats is not within at least that certain percentage.

A detailed description of this invention is hereinafter given with reference being made to the following FIGURES, in which.

Figure 1A:
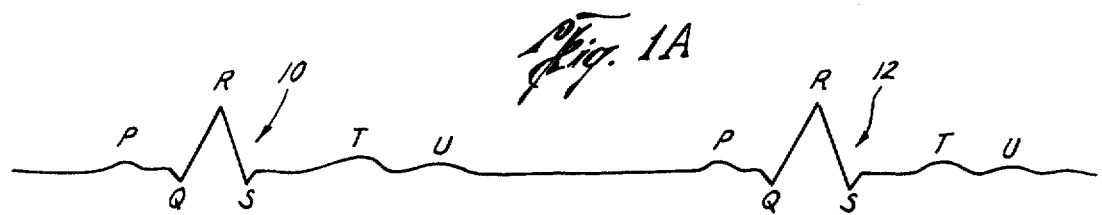
FIG. 1A shows a pair of normal heartbeat waves.

Referring now to FIG. 1A there is shown a waveform of a normal heartbeat. This waveform shows two separate beats 10 and 12, which are considered to be normal. It should be noted that all people do not have a heartbeat wave which looks exactly like the normal waves 10 or 12. This, however, does not indicate a heart disease inasmuch as a heartbeat wave is peculiar to each individual. Specifically, referring to heartbeat 10, it includes six different waves respectively labeled P, Q, R, S, T and U. It should be noted that the largest magnitude wave is the R wave and it is a simple matter to detect the occurrence of each R wave, by for example, using a threshold trigger circuit.

Figure 1B:
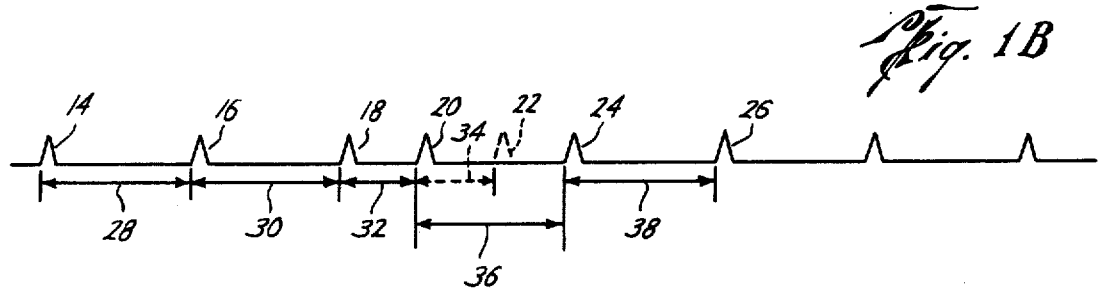
FIG. 1B shows a series of R waves in which an extrasystole beat has occurred.

Referring now to FIG. 1B a series of detected R waves 14, 16, 18, 20, 22, 24 and 26 each indicating a heartbeat is shown. The interval 28 between R waves 14 and 16 can be considered to be a normal interval as can the interval 30 between R waves 16 and 18. However, when R wave 20 occurs, it is seen that the interval 32 between R waves 18 and 20 is considerably shorter than the previous intervals 28 and 30. This indicates that the R wave 20 is a premature ventricular contraction, or an extrasystole. There is no firm definition of the ratio between intervals 32 and 30 to cause wave 20 to be considered an extrasystole. However, for the sake of a working example herein, it will be considered that where interval 32 is 80 percent, or less, of interval 30, then the wave 20 following interval 32 will be considered to be an extrasystole. Following the extrasystole wave 20 is one of either waves 22 or 24. Wave 22 results from a noncompensatory heartbeat, that is, one which occurs at the expected time had the extrasystole beat not occurred and wave 24 results from a compensatory heartbeat, or one which occurs at approximately the normal interval 36 time after wave 20 occurred. It should be noted that the extrasystole interval 32 plus the non-compensatory interval 34 would approximately equal a normal interval, such as 28 or 30. Within any given patient, it is impossible to determine whether a compensatory R wave 24 or a non-compensatory R wave 22 will occur following the extrasystole wave 20. In this event it becomes meaningless to measure and utilize the interval following the extrasystole wave 20, that is the intervals 34 or 36. Thus the next usable interval is the one between waves 24 and 26, that is interval 38.

Figure 2:
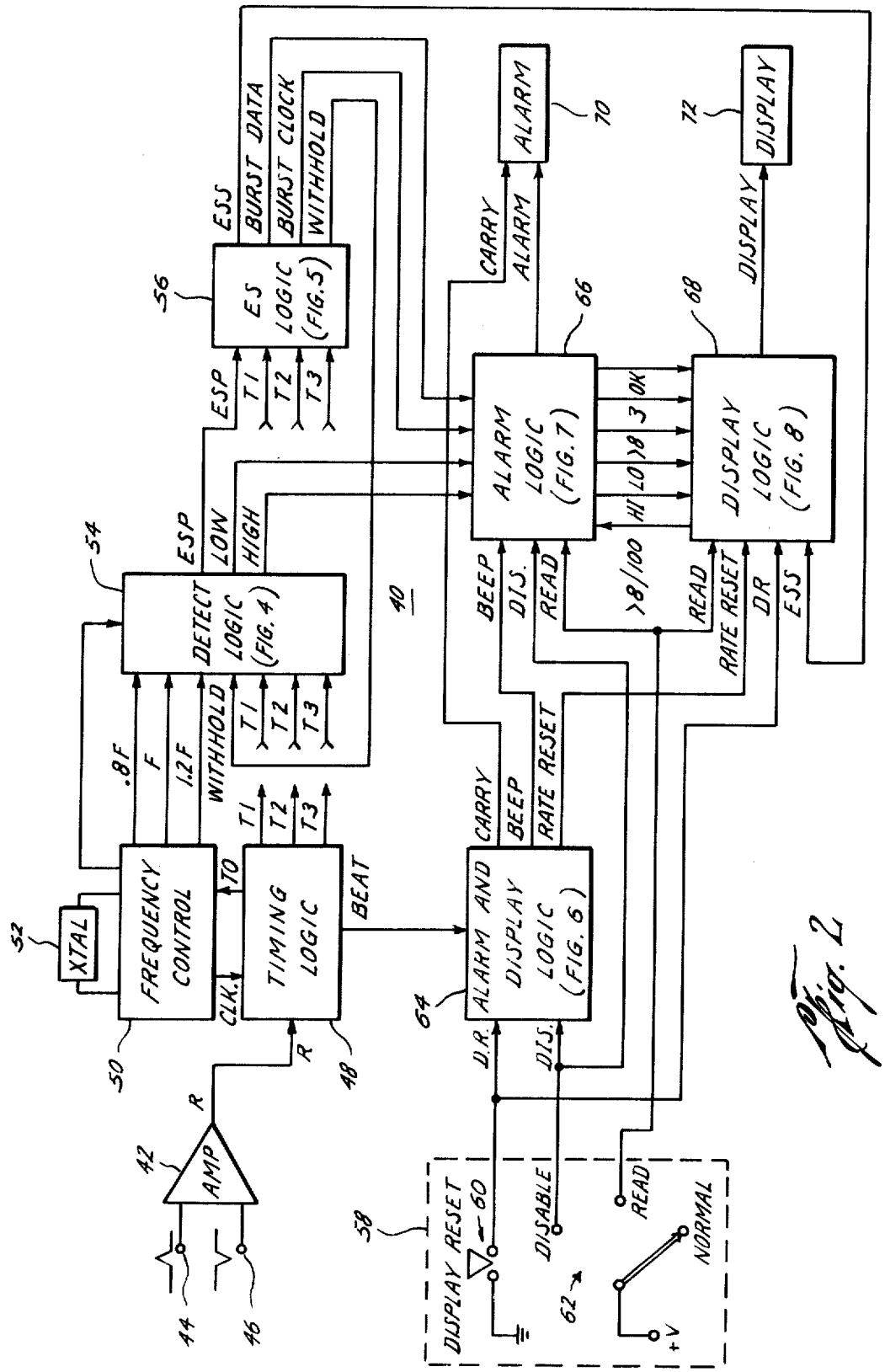
FIG. 2 is a block diagram of the heart monitor of this invention.

Referring now to FIG. 2 there is shown a general block diagram of the heart monitor system 40. Heart monitor system 40 includes a high noise rejection amplifier 42 which has a positive input 44 and a negative input 46. Conventional patient electrodes running from the right and left sides of the chest are connected to the inputs 44 and 46 of amplifier 42. The patient electrodes should be adjusted on the chest so that the wave applied to input 44 has approximately the opposite magnitude of the wave applied to input 46. The amplifier 42 will provide an R pulse signal which occurs each time an R wave is detected.

The R signal provided by amplified 42 is applied to a timing logic circuit 48. In addition, a CLK signal having a clocking frequency from frequency control circuit 50 is also applied to timing logic 48. Timing logic 48, in turn, provides timing signals T0, T1, T2 and T3 to other logic blocks within the system, as will hereinafter be described. Timing logic 48 also provides a BEAT signal each time an R wave is detected.

The T0 timing signal is applied to frequency control circuit 50 which provides, in addition to the CLK clocking signal, a 0.8F signal, an F signal and a 1.2F signal. Frequency control circuit 50 provides its signals in response to an external crystal 52 coupled thereto. The frequency of the F signal provided by frequency control circuit 50 is determined by the count capacity of counters included within detect logic 54 which are hereinafter described and the minimum expected heart rate of a patient. For instance, if an eight bit counter is provided in detect logic 54, it will have a count capacity of 256 (zero thru 255) and if the minimum expected heartbeat rate from a patient is 30 beats per minute, for an interval between beats of 2 seconds, then the frequency of the 1.2F wave should be 128 hz, or 256 counts divided by 2 seconds. The F signal then will be 106 hz and the 0.8F signal will be 85hz. A 0.8F signal is provided because of the example herein that an interval of 80 percent or less of the normal interval is caused by an extrasystole beat and a 1.2F signal is provided so that if the interval between successive heartbeats is 120 percent or greater it will be treated as a missed beat and hence, not considered to be a normal interval, as will be hereinafter described.

Figure 3:
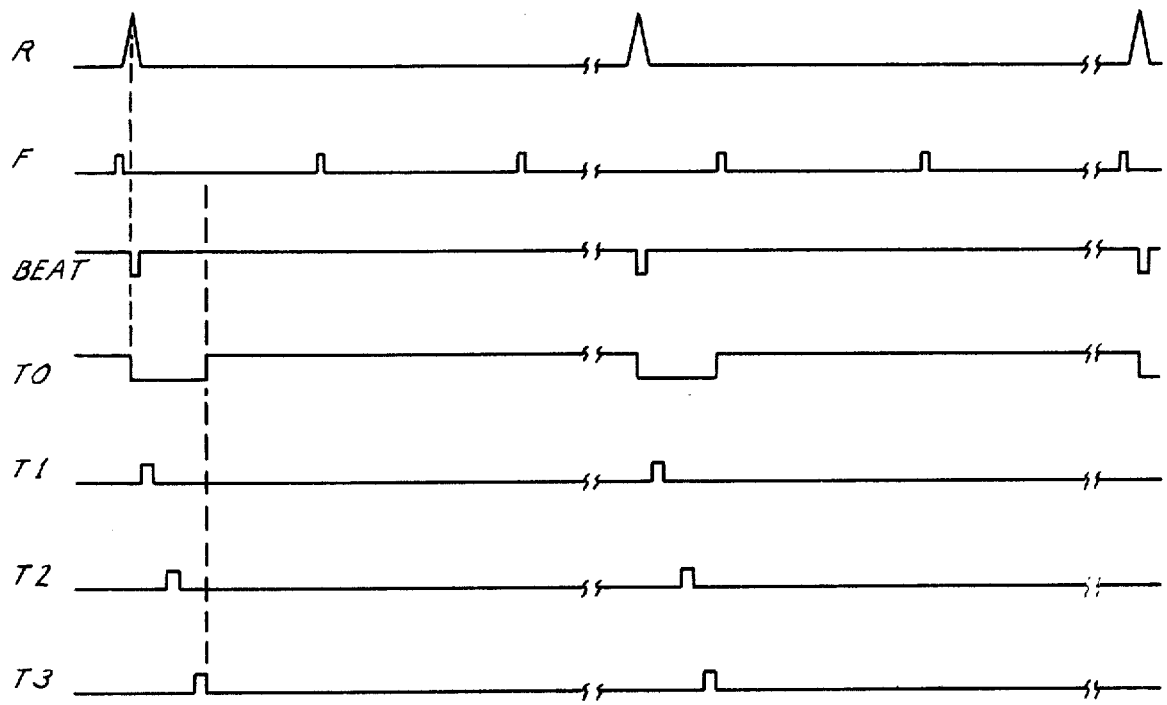
FIG. 3 shows a series of waveforms illustrating the timing relationship used with the system of FIG. 2.

Referring to FIG. 3, the R, F, BEAT, T0, T1, T2 and T3 signals are shown. The T0 timing signal provided by timing logic 48 is a low voltage signal such as zero volts, of approximately 2 milliseconds duration during T0 time and is applied to frequency control circuit 50 to inhibit the provision of any of the 0.8F, F, or 1.2F signals during the T0 time. The T1, T2 and T3 signals provided by timing logic 48 all occur during the T0 time and are each short duration high voltage pulses of, for instance 3.5 to 5.0 volts, during respective T1, T2 and T3 times. The T1 signal occurs shortly after the leading edge of the T0 signal and is followed by the T2 signal which occurs after the trailing edge of the T1 signal. The T3 signal occurs after the trailing edge of the T2 signal. The trailing edge of the T0 and T3 signals occur simultaneously. The BEAT signal provided by timing logic 48 is a low voltage pulse signal which occurs each time an R signal is provided by amplifier 42.

It is believed that it is well within the state of the art to fabricate a frequency control circuit 50 to provide the 85hz, 106hz and 128hz signals and also it is within the state of the art to provide a timing logic circuit 48 which provides the T0, T1, T2 and T3 and BEAT signals as shown in FIG. 3. Accordingly, no detailed description of either timing logic circuit 48 or frequency control circuit 50 will be given.

The 0.8F, F, 1.2F, T1, T2 and T3 signals from frequency control circuit 50 and timing logic 48 are applied to detect logic 54 which will be described in more detail hereinafter with respect to FIG. 4. In addition, detect logic 54 has a WITHHOLD signal from ES logic 56 applied thereto. Detect logic 54 provides an ESP signal each time an extrasystole is detected. Detect logic 54 further provides a LOW signal and a HIGH signal whenever respective low or high heartbeat rates are detected. As used herein, a low heartbeat rate is defined as any heartbeat rate below 60 beats per minute and a high heartbeat rate is defined as a heartbeat rate in excess of 100 beats per minute. It should be understood that for any given patient, the physician should make a determination of the high and low rates. It should also be noted that all high heartbeat rates are not indicative of problems, especially when the patient is doing a considerable amount of exercise. In this case a high rate would be considered normal.

The ESP signal from detect logic 54 is provided to ES logic 56 which is described in nore detail hereinafter with respect to FIG. 5. In addition, the T1, T2 and T3 signals are also provided to ES logic 56. ES logic 56 provides the ESS signal, the BURST DATA signal, the BURST CLOCK signal, and the WITHHOLD signal in response to the signals applied thereto.

Heart monitor system 40 also contains two control switches within switching circuit 58. The first control switch is display reset button 60 which when closed provides a low, or ground, value DR signal. The second switch is a rotary switch 62 which may be in either the "Normal" position, the "Read" position, or the "Disabled" position. When rotary switch 62 is in the Normal position, no signals are applied from switching circuit 58. When rotary switch 62 is in the Read position, the Read signal is applied from switching circuit 58 and when rotary switch 62 is in the Disabled position, the DIS signal is applied from switching circuit 58.

The DR and DIS signals from switching circuit 58 and the BEAT signal from timing logic 48 are all applied to alarm and display logic 64 which will be described in more detail hereinafter with respect to FIG. 6. Alarm and display logic 64 provides the CARRY, The BEEP and the RATE RESET signals.

Heart monitor system 40 also includes alarm logic 66 which will be described in more detail hereinafter with respect to FIG. 7. Alarm logic 66 is responsive to the BURST DATA and BURST CLOCK signals from ES logic 56, the LOW and HIGH signals from detect logic 54, the BEEP signal from alarm and display logic 64, the DIS and READ signals from switching circuit 58 and a >8/100 signal from display logic 68. In response to these signals alarm logic 66 provides the HI, LO, >8, 3 and OK signals to display logic 68, which will be described in more detail hereinafter with respect to FIG. 8. Further, alarm logic 66 provides an ALARM signal to an audible alarm 70, such as a transducer, which in addition has the CARRY signal from alarm and display logic 64 applied thereto. Display logic 68 further has the READ, RATE RESET, DR, and ESS signal applied thereto, and in response to the signals applied to display logic 68, a DISPLAY signal is applied to a display device 72.

Figure 4:
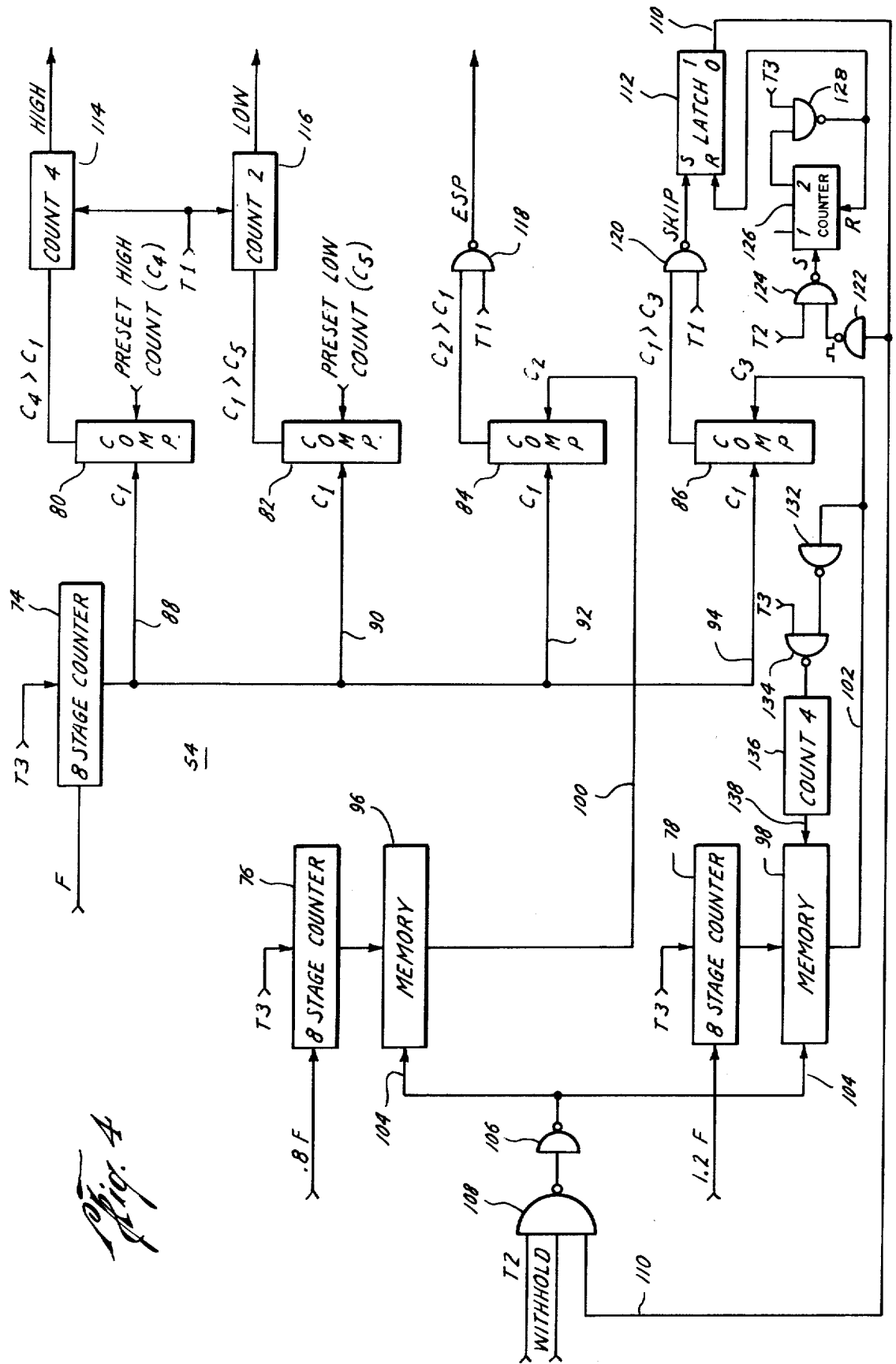
FIG. 4 is a detailed block diagram of the detect logic shown in FIG. 2.

Referring now to FIG. 4, detect logic 54 is shown in more detail. Detect logic 54 includes three eight-bit counters 74, 76 and 78 which are capable of counting between zero and 255. Counters 74, 76 and 78 are responsive to the F signal, the 0.8F signal, and the 1.2F signal provided from frequency control circuit 50. Each of the counters 74, 76 and 78 will increment its count by one each time a pulse of the F, 0.8F or the 1.2F signals occurs until a maximum count of 255 is attained. It should be noted that a maximum count will only be attained if the heartbeat rate is below 30 beats per minute in the case of counter 78, or below 25 or 30 beats per minute in the case of counters 74 and 76 respectively, and this should never happen. Each of the counters 74, 76 and 78 is further responsive to the T3 clocking signal applied to the reset input thereof to cause the counts to be reset to zero.

The particular count (C1) of counter 74 is applied, in parallel, to one input of each of comparators, 80, 82, 84 and 86 over respective lines 88, 90, 92 and 94. The output of counter 76 is applied, in parallel, to the input of memory 96, which may be no more than a series of flip-flops which can be gated to accept the information applied thereto at an appropriate time. Similarly, the output of counter 78 is applied, in parallel, to memory 98, which is similar to memory 96.

The then existing count of counter 76 is stored in memory 96 whenever a clocking signal appears on line 104 and similarly the count of counter 78 is applied to and stored in memory 98 whenever the clocking signal appears on line 104. Line 104 is the output of an inverter 106 which has the output of three input NAND gate 108 applied thereto. The inputs to NAND gate 108 are the T2 clocking signal, the WITHHOLD signal from ES logic 56 and a signal on line 110 from a latch circuit 112, included within detect logic 54.

The output of memory 96 is applied, in parallel, over line 100 as the C2 count to the other input of comparator 84. The output of memory 98 is applied in parallel over line 102 as the C3 count to the other input of comparator 86.

The other input to comparator 80 is prewired to a high count C4 of, for instance, 64 which would be the count C1 appearing on line 88 if the heartbeat rate is 100 beats per minute. The other input to comparator 82 is prewired to a low count C5 of 106 which would be the count C1 on line 90 if the heartbeat rate had been 60 beats per minute. Comparator 80 will provide a high value outut signal in the event that the prewired high count C4 is greater than the count C1 on line 88.

This high count is applied to counter 114 which can come to four and then provide the HIGH signal during T1 time if, during the previous four T1 times, a high value signal was provided thereto from comparator circuit 80. Similarly comparator circuit 82 will provide a high value signal if the prewired low count C5 is less than the C1 count applied from line 90. the output of comparator 82 is provided to a counter 116 which will provide the LOW signal if comparator 82 has provided a high value signal during the preceding two T1 time periods.

The output from comparator 84 will be a high signal whenever the C2 count appearing on line 100 is greater than the C1 count appearing on line 92. The output of comparator 84 is applied to one input of NAND gate 118, the other input of which is the T1 clocking signal. The output of NAND gate 118 is the ESP signal. Whenever the C2 count is greater than the C1 count, that is, the output of comparator 84 is a high signal, at T1 time, an extrasystole is detected.

The output of comparator 86 will be a high signal whenever the C1 count applied from line 94 exceeds the C3 count applied from line 102. The output of comparator 86 is applied to one input of NAND gate 120, the other input of which is the T1 signal. The output of NAND gate 120 is the SKIP signal which indicates that a skipped beat has occurred. The SKIP signal is applied to the set input of latch 112 and causes the signal at the 0 output therefore to go from a normally high to a low value on line 110, which has previously been described as being the third input of NAND gate 108. Inverter 122 has its input coupled to line 110 and provides an output to one input of NAND gate 124. The other input of NAND gate 124 is the T2 clocking signal. During the time the signal on line 110 is at a low value the output of inverter 122 is at a high value. Thus, during each T2 signal, the output of NAND gate 124 will be a low value pulse. Each of these low value pulses will cause a 1 bit to be shifted into two stage counter 126. The output of the second stage of counter 126 is coupled to one input of NAND gate 128 which has a second input thereof coupled to the T3 clocking signal. Thus, whenever counter 126 has a 1 bit in the second stage thereof (a count of two) and the T3 signal occurs, an output will occur from NAND gate 128. The output of NAND gate 128 is applied to the reset input of counter 126 and causes the count thereof to return to zero. The output of NAND gate 128 is also applied to reset latch 112 and cause the signal on line 110 to return to the normally high value.

Line 110 is also coupled to one input of inverter 132, the output of which is coupled as one input of a NAND gate 134. The other input of NAND gate 134 is the T3 signal. The output of NAND gate 134 is coupled to counter 136 which can count to a value of four. When counter 136 reaches a count of four, it provides an output signal on line 138 which is applied to memory 98 to gate the contents of counter 78 into memory 98. The function of inverter 132, NAND gate 134 and counter 136 is to initially put a count in memory 98 at the time power is first applied to system 40. Otherwise there could be a continuous indication of skipped heartbeats. The function of latch 112, inverter 122, NAND gate 124, counter 126 and NAND gate 128 is to prevent a count resulting from a skipped beat interval from being stored in memory 96. If this were to occur, every normal beat subsequent to the skipped beat interval would be detected as an extrasystole because the count in counter 74 as a result thereof would be less than 80 percent of the skip-beat interval count in memory 96, and thus the system would not operate properly.

The operation of detect logic 54 will now be described with reference also being made to the waveforms shown in FIG. 1A and FIG. 3. After each heartbeat (e.g. wave 16 in FIG. 1B) occurs, the T3 clocking signal causes each of the counters 74, 76 and 78 to be reset to a zero count. Assuming a normal interval (e.g., interval 28 in FIG. 1B) had preceeded this latest heartbeat, the contents of counters 76 and 78 are transferred into memories 96 and 98, respectively, as a result of a high signal appearing on line 104. Thus, memories 96 and 98 are now storing counts indicative of 80 percent and 120 percent respectively of the last normal interval (e.g., interval 28). Thereafter each of counters 74, 76 and 78 begins counting at the F, the 0.8F and the 1,2F rates until the next R wave (e.g., wave 18) is detected. A T0 signal is then provided which causes the F, 0.8F, and the 1.2F signals to stop. At this time the count C1 on lines 88, 90, 92 and 94 will be indicative of the interval between the first mentioned and last mentioned detected R waves (e.g., interval 30). During T1 time immediately following the last detected R wave (e.g., wave 18) the comparators 80 and 82 will compare the counts C1 appearing on respective lines 88 and 90 against the preset counts thereof to determine if either a high or low heartbeat rate is occurring. If comparator 80 detects a high heartbeat rate by determining that the preset C4 count is greater than the C1 count on line 88, it will provide the high value signal to the counter 114. If this is the fourth consecutive high value signal in a row applied during time T1 to count 114, then the HIGH signal will be applied therefrom. In the case of comparator 82, the output thereof will be a high value if the count C1 on line 90 is greater than the preset count C5. If this is the second consecutive high value signal applied by comparator 82 during time T1, then counter 116 will provide the LOW signal during time T1.

With respect to comparator 84, if the count C1 occurring on line 92 is greater than the count C2 provided from memory 96 over line 100, then comparator 84 will provide a low output signal to NAND gate 118. In this situation, NAND gate 118 will not provide the low value ESP signal during time T1. It should be noted that the count stored by memory 96 is a count related to the previous normal interval (e.g., interval 28) and was made at eighty percent of the frequency of the count C1. Thus, even though the latest interval (e.g., interval 30) may be of shorter duration than the stored normal interval, the count C1 will exceed the count C2 as long as the last interval is more than eighty percent of the interval preceeding it. However, if during time T1 and C1 count is less than C2 count (e.g., in the situation follwing beat 20 where the count in counter 74 would be indicative of interval 32 and the count in memory 96 would be indicative of interval 30) indicating that the last occurring interval (e.g., interval 32) was eighty percent or less than the stored normal interval (e.g., interval 30), then the output of comparator 84 will be a high value signal. When the T1 timing signal becomes a high value following the detection of the last R wave (e.g., wave 20), NAND gate 118 provides a low value signal during the T1 time period. This signal is the ESP signal which indicates that an extrasystole has been detected.

Comparator 86 operates similarly to comparator 84, except that it detects a skipped heartbeat rather than the extrasystole, If the C3 count stored in memory 98 is more than the C1 count provided from counter 74, the output of comparator 86 will be low value signal and no low value signal during T1 time will be provided by NAND gate 120. This indicates that no skipped beat had occurred. However, where the C1 count is greater than the C3 count, thereby indicating the latest occurring interval is 120 percent or more greater than the last normal interval, the output of comparator 86 will be a high signal, thereby allowing NAND gate 120 to provide a low value SKIP pulse during T1 time.

The low value SKIP pulse sets latch 112 so that the output on line 110 becomes a low value. This low value output inhibits NAND gate 108 from providing a low value output each time the T2 timing signal occurs. Thus, the output of inverter 106 remains low and no high value signals appear on line 104 to cause the contents stored in counter 76 or 78 to be transferred to respective memories 96 and 98. This is as desired because the SKIP signal indicates that the last interval was a nonnormal interval due to the skipped beat and the interval would be approximately twice as long as a normal interval. Because the heartbeat following a skipped beat interval may be somewhat erratic, it is desired not to transfer a count related to either the skipped beat interval and the immediately following interval into the memories 96 or 98, but rather to maintain the previous stored normal interval count therein. For this reason the inverter 122, NAND gate 124, two stage counter 126 and NAND gate 128 are provided. When the output from latch 112 on line 110 becomes low, a high signal is applied at the output of inverter 122. This signal allows each T2 signal to be applied as a low value signal at the output of the NAND gate 124. Each low output from NAND gate 124 increment counter 126. Thus, immediately after the detected heartbeat indicating a skipped interval (at T1 time), counter 126 goes to a count one (at T2 time), or, in other words, the first stage thereof becomes set. At the following heartbeat, which may or may not represent a normal interval, a second low signal is provided during T2 time from the output of NAND gate 124 and the counter 126 goes to a count of two, or in other words, the second stage is set and the 2 output therefrom becomes a high value signal. The 2 output signal from counter 126 is applied to one input of NAND gate 128, the other input of which has the T3 signal applied thereto. Thus, when the T3 signal becomes high, a low value signal is applied from the output of NAND gate 128 to reset counter 126 to a zero count. The low output signal from NAND gate 128 also resets latch 112 so that the signal on line 110 becomes high. This again enables gate 108 so that a high signal again appears on line 104 and following the next heartbeat during that T2 time, and the counts in counters 76 and 78 are transferred to respective memories 96 and 98. Thus, the count transferred to memories 96 and 98 will be reflective of the interval between the second and third heartbeats following the detection of the skipped beat interval, which should be a normal interval again.

When another skip interval is detected, the same procedure again results. Each time a successive skipped interval occurs, the counter 136 will increment its count by one during the T3 time. If it ever achieves a count of four which indicates four successive skipped intervals have been detected, then the contents of the counter 78 will be transferred to memory 98. The reason that four skipped intervals are selected is that during the initial start-up, memory 98 may have a zero count therein and the output of comparator 86 will always be high. This being the case, the start up is detected by the output of counter 136 becoming a high signal, and the last interval count in counter 78 is transferred to memory 98 on the assumption that it is a normal interval. If this is not the case, it will soon be detected and a normal interval will eventually be transferred into memory 98.

The ESP signal is provided to ES logic 56 as seen from FIG. 2 and in response thereto ESP logic provides the WITHHOLD signal back to detect logic 54. The WITHHOLD signal operates in exactly the same manner as did the signal on line 110, that is, it prevents the counts in countes 76 and 78 from being transferred to respective memories 96 and 98 until one full interval after the detected extrasystole has occurred.

Figure 5:
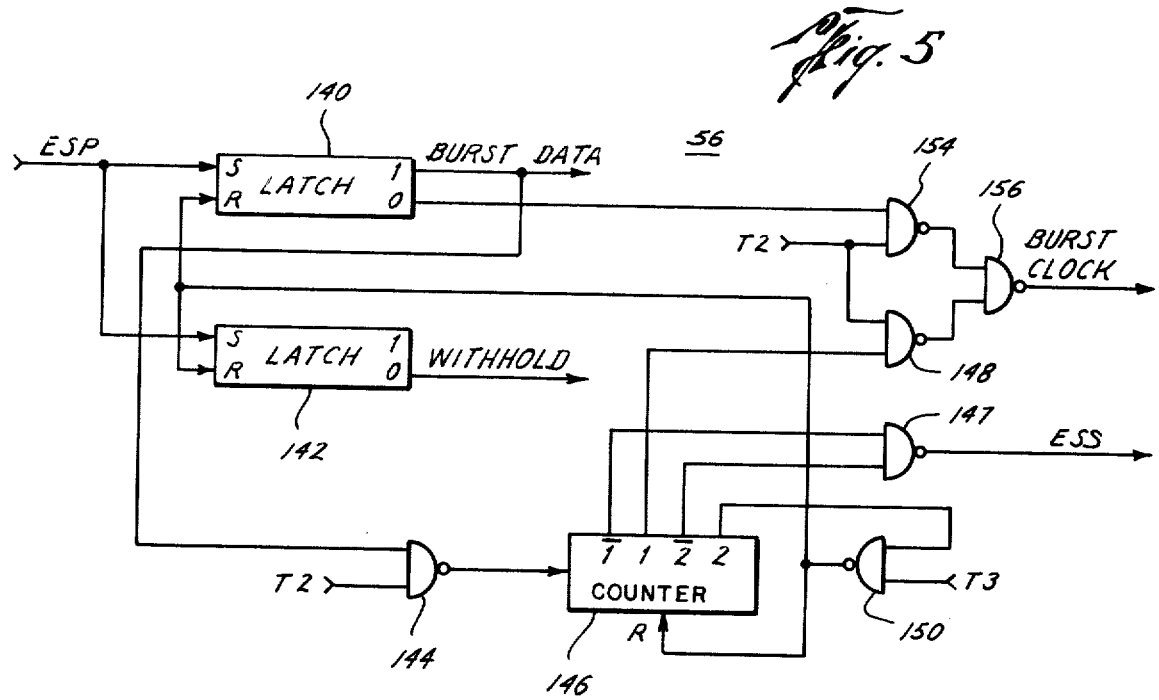
FIG. 5 is detailed block diagram of the extrasystole (ES) logic shown in FIG. 2.

Referring now to FIG. 5, ES logic 56 provides the WITHHOLD signal which is applied to NAND gate 108. ES logic 56 includes a first latch 140 and a second latch 142. The set input of each of latches 140 and 142 is responsive to the low value ESP signal provided from NAND gate 118 in FIG. 4. This signal sets each of the latches 140 and 142 causing the signal at the 1 output thereof to go from a normally low value to a high value, and further causing the signal at the 0 output thereof to go from a normally high value to a low value. The 1 output of latch 140 provides the BURST DATA signal and the 0 output of latch 142 provides the WITHHOLD signal, previously referred to with respect to FIG. 4. The BURST DATA signal is applied as one input to NAND gate 144, the other input of which is the T2 clocking signal. The output of NAND gate 144 is a low value pulse during T2 whenever the BURST DATA signal is at a high value and is applied to the shift input of two stage counter 146 to increment the count thereof. Counter 146 has two outputs from each of its two stages, which are the $\bar{1}$ and 1 outputs from the first stage and the $\bar{2}$ and 2 outputs from the second stage. When either stage is in the normally reset state, the 1 or 2 output will provide a low value signal and the $\bar{1}$ or $\bar{2}$ output will provide a high value signal. When either stage is in the set state, the 1 or 2 outputs will provide a high value signal and the $\bar{1}$ and $\bar{2}$ signals will provide a low value signal.

The first low value signal from NAND gate 144 causes the first stage to become set and the next low value signal from NAND gate 144 causes the second stage to become set. The $\bar{1}$ and $\bar{2}$ output signals from counter 146 are connected to the two inputs of NAND gate 147, the output of which is the ESS signal. Thus, the ESS signal will be a high value whenever either stage of counter 146 is set. The 1 output signal from counter 146 is applied as one input of NAND gate 148, the other input of which is the T2 signal. The 2 output signal from counter 146 is applied to one input of NAND gate 150, the other input of which is the T3 signal. The signal of the output of NAND gate 150 is applied to the reset input of counter 146 and to the reset input of latches 140 and 142. The 0 output from latch 140 is applied to one input of a NAND gate 154, the other input of which is the T2 timing signal. The outputs of NAND gates 148 and 154 are applied as the two inputs of NAND gate 156. The output of NAND gate 156 is the BURST CLOCK signal.

The operation of ES logic 56 is as follows: Prior to the occurrence of an ESP signal, NAND gate 154 is enabled by the normally high value of the 0 output of latch 140 and the BURST CLOCK signal has a high value pulse during each T2 time. Upon the occurrence of a low value ESP signal during time T1 applied from gate 118 in FIG. 4, latches 140 and 142 both become set, thereby causing the BURST DATA signal to become a high value and the WITHHOLD signal to become a low value. The low value of the WITHHOLD signal inhibits gate 108 in FIG. 4 from passing T2 pulses and thereby prevents the transfer of the counts from counter 76 to memory 96 and from counter 78 to memory 98, as has previously been described. The BURST DATA signal from latch 140 enables NAND gate 144 to begin passing T2 pulses to counter 146. When the first T2 signal is applied to counter 146 very shortly after the ESP signal becomes low, the 1 output from the first stage of counter 146 provides a low value signal to NAND gate 147, which in turn provides the high value ESS signal. At the same time, the 1 output from counter 146 provides a high value signal to NAND gate 148, which allows the T2 pulse then applied to NAND gate 148 to become a BURST CLOCK pulse. As will be explained hereinafter, this BURST CLOCK signal is used to record the high value BURST DATA signal.

After the next heartbeat, whether it is compensatory or non-compensatory, and the subsequent T2 signal, the count in counter 146 is incremented to a count of two, or in other words, the $\bar{1}$ and 2 signals therefrom becomes high and the 1 and $\bar{2}$ signal becomes low. In this instance, the low value $\bar{2}$ signal applied to NAND gate 147 maintains the ESS signal at a high value. However, since both the 1 signal from counter 146 and the 0 output from latch 140 are low values, no BURST CLOCK pulse will be applied from NAND gate 156. The high value 2 signal from counter 146 is applied to NAND gate 150 which at time T3 resets latch 142 and counter 146, thereby causing the WITHHOLD signal to return to its normal high value and the count in counter 146 to return to zero. Thus, during T2 time following the next heartbeat, memories 96 and 98 will be updated with data from a presumably valid beat.

Figure 6:
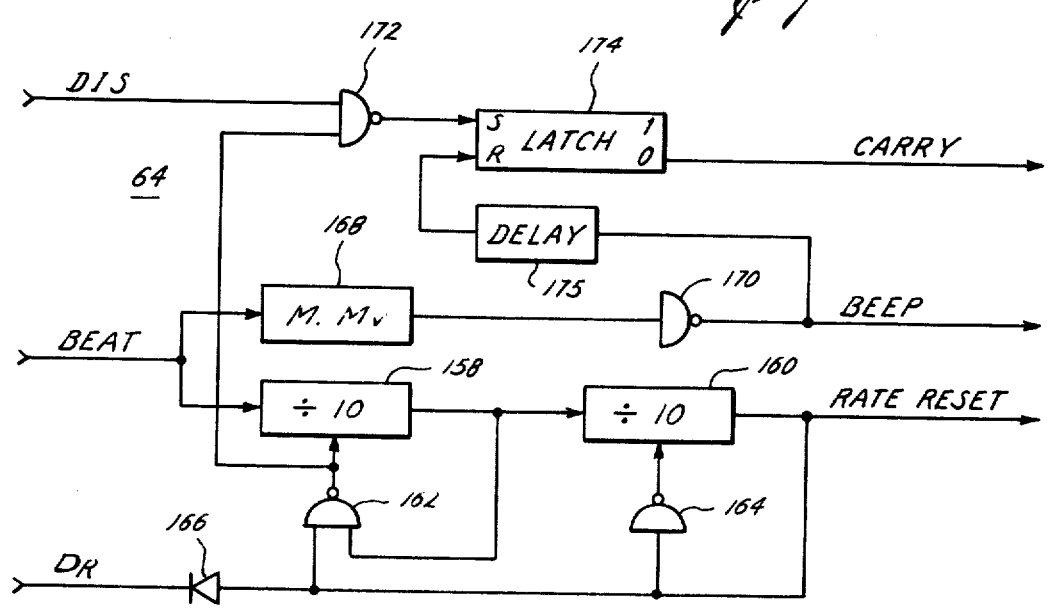
FIG. 6 is a detailed block diagram of the alarm and display logic shown in FIG. 2.

Referring now to FIG. 6, the alarm and display logic 64 is shown in detail. Alarm and display logic 64 includes a first divide by ten circuit 158 and a second divide by ten circuit 160. The BEAT signal is provided as the input divide by ten circuit 158 and the output thereof is a low value pulse which occurs after each ten BEAT signals have occurred. It should be recalled that the BEAT signal occurs after each heartbeat. The output of divide by ten circuit 158 is applied as the input of divide by ten circuit 160, the output of which is a low value RATE RESET signal which occurs once every 100 heartbeats.

The output of divide by ten circuit 158 is also connected as one input to NAND gate 162, the output of which is used to reset divide by ten circuit 158 to the zero state. The output of divide by ten circuit 160 is coupled thru inverter 164 to the reset input of divide by ten circuit 160. the output of divide by ten circuit 160 is also coupled to the other input of NAND gate 162. The DR signal from the display reset button 60 in switching circuit 58 (FIG. 1) is coupled thru the cathode anode path of diode 166. It should be recalled that the DR signal is low, it causes the normally high signal from the output of divide by ten circuit 160 to become low at the inputs of inverter 164 and NAND gate 162, and thereby resets both divide by ten counters 158 and 160.

The BEAT signal is also applied to the input of monostable multivibrator 168 which provides a low value pulse of a fixed duration that is applied thru inverter 170 to become a high value pulse of the fixed duration, labeled as the BEEP signal. The DIS signal from Disable setting of the rotary switch 62 in switching circuit 58 (FIG. 1) is applied to one input of a NAND gate 172, the other input of which is the output of NAND gate 162. The output of NAND gate 172 is coupled to the set input of latch circuit 174. The reset input of latch 174 is coupled through delay circuit 175 to the output of inverter 170. The 1 output of latch 174 is the CARRY signal.

The operation of alarm and display logic 64 is as follows: Each time a heartbeat occurs, the BEAT signal sets multivibrator 168 which causes a high value BEEP pulse to be provided. This pulse will eventually control the audible alarm. Each BEAT pulse also is applied through the two divide by ten circuits 158 and 160 and for every one hundred BEAT pulses a low value RATE RESET pulse is provided. In addition, the RATE RESET pulse is also provided by pushing the display reset button 60.

The rotary switch 62 (FIG. 1) is placed in Disable position when it is desired to turn off the alarm indicating a high heartbeat rate, because, for instance, the patient knows he will be doing some running and can expect his heartbeat rate to exceed the high rate value of one hundred beat per minute maximum set into comparator 80 (FIG. 4). However, when the rotary switch 62 is in the Disable position, the audible alarm will still occur once each ten beats, giving the patient warning that the Disable switch is on but not causing an undue amount of alarm to occur. Accordingly, the DIS signal enables NAND gate 172 to provide a low value pulse each time a high output signal is obtained from the output of NAND gate 162. Thus, the output of NAND gate 172 is a low value pulse after each ten BEAT pulses have been applied to divide by ten circuit 158. Each low value pulse from NAND gate 172 sets latch 174 which provides the CARRY signal from the 0 output thereof. It is this CARRY signal which causes the audible alarm to sound once each ten heartbeats when the rotary switch 62 is set in the Disable position.

Figure 7:
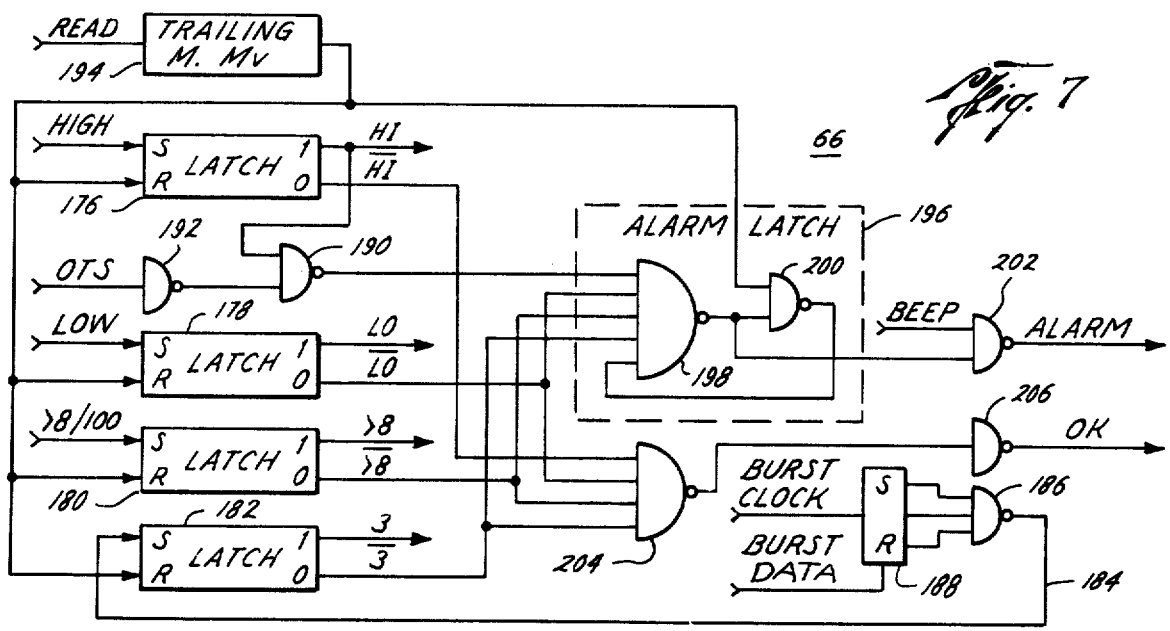
FIG. 7 is a detailed block diagram of the alarm logic shown in FIG. 2.

Referring now to FIG. 7, the alarm logic 66 is shown. Alarm logic controls the sounding of the alarm whenever a high or a low heartbeat rate is detected, whenever the extrasystole rate per one hundred beats is greater than eight or whenever a series of three extrasystole beats occur together. It further provides a signal which indicates that the heart is operating in a normal manner. Alarm logic 66 includes four latches, 176, 178, 180 and 182 which, when set, respectively indicate that a high heart rate is occurring, a low heart rate is occurring, there have been more than eight extrasystole beats during the last one hundred beats, or that three extrasystole beats have occurred together. Specifically, latch 176 is set by the HIGH signal from detect logic 54. Latch 178, similarly, is set by the LOW isgnal provided from detect logic 54. Latch 180 is set by a >8/100 signal provided from display logic 68, which will be described hereinafter with respect to FIG. 8. Finally, latch 182 is set by a low value signal appearing on line 184 which is coupled to the output of a NAND gate 186. The inputs of NAND gate 186 are coupled to the three outputs of a three stage shift register 188. The BURST CLOCK signal from ES logic 56 is applied to a clocking input of shift register 188 and the BURST DATA signal from ES logic 56 is applied to the data input of shift register 188. If the BURST DATA signal is at a high value during the occurrence of three successive BURST CLOCK pulses, then each of the three stages of shift register 188 will provide a high value signal. In this event, the output from NAND gate 186, appearing on line 184, will be a low value pulse which causes latch 182 to become set. This, in turn, causes the 1 output thereof to become high and the 0 output thereof to become low. Similarly when latches 176, 178 or 180 are set, the 1 outputs thereof, which are the respective HI, LO and >8 signals, become high and the 0 outputs thereof, which are the respective $\overline{HI}$, $\overline{LO}$ and $\overline{>8}$ signals, become low.

The 1 output of latch 176 is coupled to one input of NAND gate 190, the other input of which is coupled to the output of inverter 192. The input to inverter 192 is the DIS signal which is provided when rotary switch 62 is set in the Disable position. In this instance, the output of inverter 192 is a low value signal, which disables NAND gate 190 from passing the high value HI signal from the 1 output of latch 176 whenever a high heart rate is indicated by the HIGH signal being a low value.

Whenever thr rotary switch 62 is set to the Read position, the READ signal is applied to the input of trailing edge monostable multivibrator 194. The trailing edge of the READ signal triggers multivibrator 194 to provide a low value pulse for a fixed duration. It should be noted that the trailing edge of the READ signal occurs after rotary switch 62 is turned to either the Disable or the Normal positions from the Read position. The output signal from multivibrator 194 is applied to reset each of the latched 176, 178, 180 and 182 so that after an abnormal condition of the heart has been read and becomes known to the patient, the system is reset so that any further abnormalities can be again indicated by the audible alarm and read on the display.

Alarm logic 66 also includes an alarm latch 196. Alarm latch 196 includes set NAND gate 198 and a reset NAND gate 200. The output of set NAND gate 198 is applied as one input to reset NAND 200, the other input of which is the output of multivibrator 194. The output of NAND gate 200 is applied to one input to set NAND gate 198. The other inputs of NAND gate 198 are respectively the output of NAND gate 190, the $\overline{LOW}$ signal at the 0 output of latch 178, the $\overline{>8}$ signal at the 0 output of latch 180, and the $\overline{3}$ signal at the 0 output of latch 182. Each of the signals applied to NAND gate 198 is normally at a high value, thereby maintaining the output of NAND gate 198 at a low value. However, if an abnormality occurs in the heartbeat, one or more of the 0 output signals from latches 176, 178, 180 or 182 will become a low value, thereby causing the output from NAND gate 198 to become high value. This, together with the normally high value output signal from multivibtator 194, causes the output of gate 200 to become a low value which, when fed back to the input of NAND gate 198, maintains the output of NAND gate 198 at a low value. This condition can only be changed when the trailing edge of the READ signal is applied to multivibrator 194 to cause the output thereof to become a low value pulse. This causes the output of NAND gate 200 to become a high value which, in turn, allows the output of NAND gate 198 to again become a low value.

The output from NAND gate 198 is also applied as one input to NAND gate 202. The other input to NAND gate 202 is the BEEP signal from the output of invertor 170 in FIG. 6. Thus, whenever the alarm latch 196 is set by one or more of the signals applied to NAND gate 198 going to a low value, the BEEP signal is applied thru NAND gate 202 to become the ALARM signal. The ALARM signal is applied to alarm 70, shown in FIG. 2, to cause alarm 70 to sound an audible alarm which alerts the patient that something is wrong.

If the heartbeat is neither high nor low, nor is the extrasystole rate of greater than eight per one hundred beats, nor has there been three extrasystoles in a row, then the patient's heart is functioning normally. To indicate his, NAND gate 204 is provided. The inputs to NAND gate 204 are the 0 outputs of the latches 176, 178, 180 and 182, which, when at a high value, indicate that there are no problems involved with the patient's heart at that time. The output signal from NAND gate 204 is coupled through inverter 206 to become the high value OK signal if no problems exist.

Figure 8:
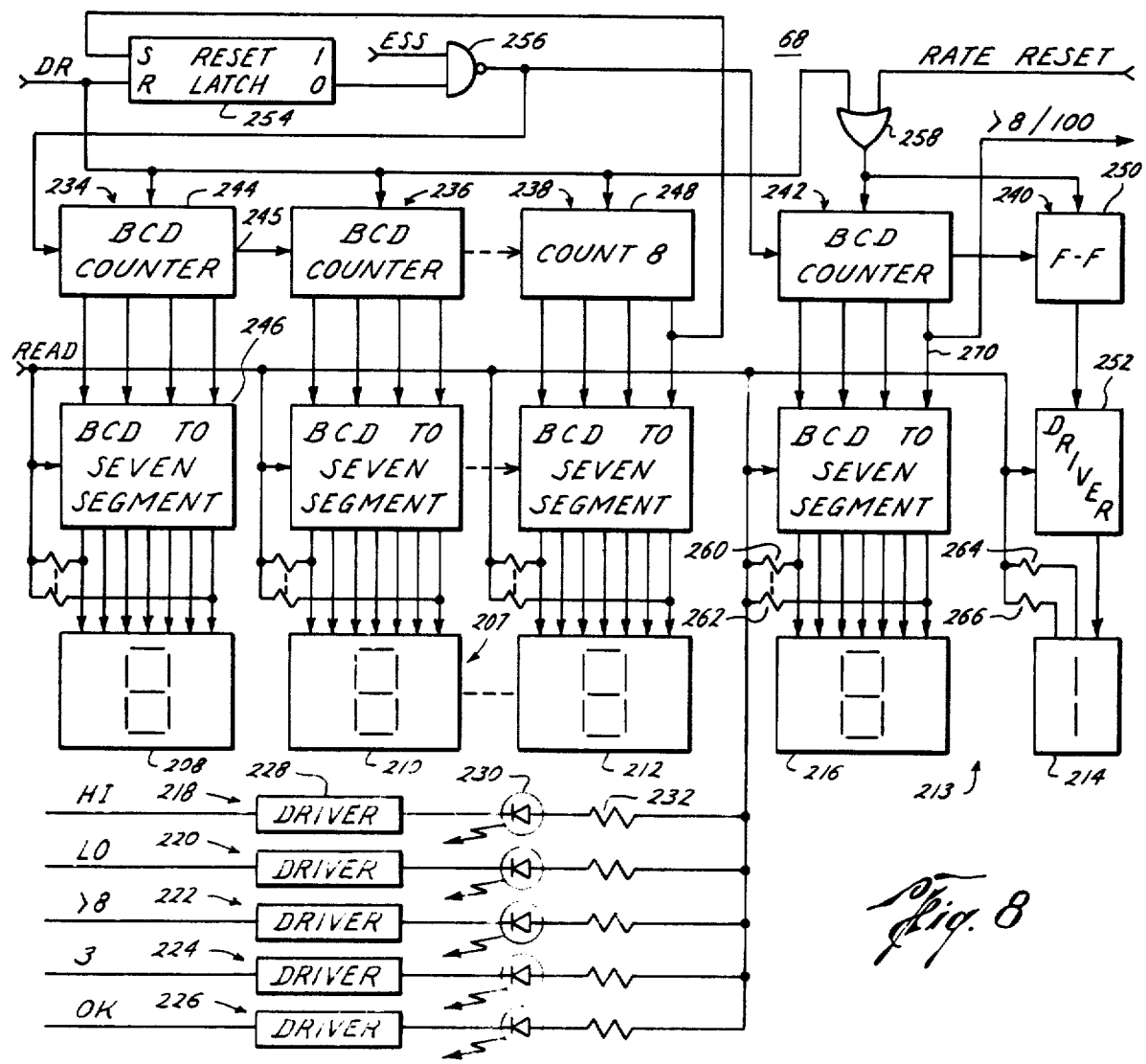
FIG. 8 is a detailed block diagram of the display logic and display shown in FIG. 2.

Referring now to FIG. 8, display logic 68 and display 72 are shown in detail. Display 72 includes a cumulative readout area 207 which has a series (three of which are shown) of seven segment numeric readout elements 208, 210 . . . 212 that give a numeric readout of the total number of extrasystoles since that last low value of the DR signal occurred. In addition, display 72 includes a two-segment readout element 214 which can be read the numeral one and a seven-segment readout element 216 which can read any numeric digit. Readout elements 214 and 216 are used to display the rate of extrasystoles occurring, that is, the number per one hundred beats which occur. Finally, display 72 includes five light emitting diodes circuits 218, 220, 222, 224 and 226 which indicate, when lit, respectively that a high heart rate occurred, that a low heart rate occurred, that the extrasystole rate was greater than eight per one hundred, that three extrasystoles in a row occur, or that everything is functioning normally. Each of the light emitting diodes circuits 218, 220, 222, 224 and 226 includes a driver 228, a light emitting diode 230 and a resistor 232. The inputs to the respective drivers 228 in each of the circuits 218, 220, 222, 224 and 226 is respectively the HI signal, the LO signal, the >8 signal, the 3 signal and the OK signal from display logic 66, shown in FIG. 7. The output of each of the respective drivers 228 is coupled to the cathode of one of the light emitting diodes 230 and the anode of the light emitting diode 230 is coupled to one end of the resistor 232. The other ends of each of the resistors 232 is coupled together and to the READ signal. Thus, whenever the READ signal is a high value, those light emitting diodes 230 having a high signal applied through the driver circuit 228 will light, indicating what the problem is with the patients heartbeat.

Each of the display panels 208, 210, 212, 214 and 216 is caused to display a digit in response to signals provided thereto from a respective segment display circuit 234, 236, 238, 240 and 242. Circuit 234, which is identical with circuits 236 and 242 contains binary coded decimal (BCD) counter 244 and BCD to seven segment convertor circuit 246. BCD counter 244 responds to an input thereof (each of which represents the occurrence of an extrasystole) by counting to ten and providing a PULSE signal output 245 thereof. Each BCD counter 244 has four stages and provides a BCD count signal at parallel outputs thereof which are applied to BCD to seven-segment converter circuit 246. Circuit 246 converts the BCD count zero through nine provided by BCD counter 244 into a seven-segment code which can be displayed by the seven segments of each display block 208, 210, 212, or 216. Each of circuits 244 and 246 are well known in the art. Circuit 238 differs from circuits 234, 236 and 242 only in that the BCD counter 244 is replaced by a count eight counter 248. The reason for this is that in this preferred embodiment, it is desired to only count up to 8,000 pulses per day. Thus, an additional circuit (not shown) identical to circuits 234, 236 and 242 is placed between circuits 236 and 238 and an additional seven-segment display element (not shown) is placed between elements 210 and 212. The circuit 240 for the two-segment display 214 may consist of a single flip-flop 250 and a single driver transistor 252 which provides either a high value or a low value signal to the display element 214, thereby indicating that it should display or not display the number one. There should be no reason why the rate of extrasystoles per one hundred beats should exceed 19; thus, it is only necessary for the most significant digit of the rate area 213 to be a 1. In addition, the display logic 68 includes reset latch 254, NAND gate 256, and OR gate 258. The set input to reset latch 254 is taken from the fourth stage of the count eight counter 248. When latch 254 is set, the 0 output thereof becomes a low value signal and inhibits any further ESS pulses from passing through NAND gate 256. Latch 254 is reset by a low value DR signal caused by the depression of display reset button 60 in switching circuit 58. The low value DR signal also resets each of the BCD counters 244 in circuits 234, 236 and 240 as well as count eight counter 248 and the flip-flop 250. In addition, the rate area 214 display elements 214 and 216 can be reset by the RATE RESET signal applied from alarm and display logic 64. Both the RATE RESET and the DR signals are applied through OR gate 258, the output of which is coupled to the reset inputs of the BCD counter in circuit 242 and flip-flop 250 in circuit 240.

When it is desired to have a display of either accumulative number of extrasystole pulses or the rate of extrasystole pulses per 100 beats, or to see if the HI, LO >8, 3, or OK lights are illuminated, rotary switch 62 is set to the Read position and a high value READ signal is provided. This signal is coupled to each of the BCD to seven-segment circuits 246 and the driver 252, as well as through resistors 260 . . . 262 which are respectively coupled to each of the seven outputs of the BCD to seven-segment converter 246 in circuits 234, 236, 238 and 242 and through the two resistors 264 and 266 coupled to display element 214. This energizing voltage allows the proper segments of each of the display elements 208, 210, 212, 214 and 216 to be illuminated, thereby giving display of either cumulative number of the extrasystoles since the last display reset on display elements 208, 210 . . . 212 and the rate of extrasystoles per one hundred beats on display elements 214 or 216.

It should be noted that the RATE RESET signal applied through OR gate 258 to reset the BCD counter in circuit 242 and flip-flop 250 is provided once for each one hundred heartbeats. Thus, if the most significant stage of the BCD counter in circuit 242 should ever provide a high value signal to line 270, this indicates that there have been eight, or more, extrasystoles during the last one hundred heartbeats. This high value signal on line 270 is applied as the >8/100 signal from display logic 68 to the alarm logic 66 and processed there in the manner previously described.

Thus, referring again to FIG. 2, it is seen that the timing signals T0, T1, T2 and T3 provided from timing logic 48 occur once for each heartbeat whether normal or abnormal and the 0.8F, F and 1.2F signals are provided from frequency control circuit 50 except during the time the T0 timing signal is provided. Detect logic 54 detects the intervals between successive heartbeats and determines whether the heart rate is a high rate, a low rate, and whether the last heartbeat was an extrasystole. If an extrasystole is detected by logic 54, then the ESP signal is applied to ES logic 56, which causes the ESS signal to be applied to and counted by display logic 68. Further, ES logic 56 provides BURST DATA and BURST CLOCK signals to the alarm logic 66 to determine if three extrasystoles occur in a row. Finally, ES logic 56 provides the WITHHOLD signal back to the detect logic 54 to prevent the next occurring interval from being used as a normal interval in the comparing circuitry of detect logic 54.

If detect logic 54 had determined that a high heartbeat rate or low heartbeat rate is occurring, it provides respective HIGH and LOW signals to the alarm logic 66, which, in turn, would cause the HI or LO signals to be applied to display logic 68 to cause a visual indication of either condition. The heart monitor system 40 also includes the switching circuit 58 which can cause the display indications to be reset by the depression of Reset button 60 and further, which can operate in a Normal setting, a Read setting or a Disable setting, depending on the position of rotary switch 62. Each of the positions of switch 62 or the depression of button 60 causes an appropriate logical response by the alarm and display logic 64, the alarm logic 66 or display logic 68 to cause the result commanded by the particular setting in switching circuit 58.

What is claimed is:
1. A heart monitoring system comprising:
  A. means for providing a beat signal indicative of the occurrence of each heartbeat, whereby a normal or an abnormal time interval exists between successive heartbeats;
  B. control means responsive to said beat signal for determining the interval between beat signals and for providing a first interval signal manifesting the time of said last occurring interval and for comparing said signal manifesting said last occurring interval with a stored signal manifesting the last occurring normal interval to determine whether the duration of said last occurring interval is at lease a certain percentage of the duration of said last occurring normal interval, said control means further providing a compared signal manifesting whether said last occurring interval is at least said certain percentage of said stored last occurring normal interval; and
  C. storing means responsive to said compared signal for storing a signal manifesting the duration of the time interval of said last occurring interval as said last occurring normal interval only in the event said last occurring interval is at least said certain percentage.

2. The invention according to claim 1 wherein said system further includes inhibiting means responsive to the provision of said compare signal for providing an inhibit signal to said storing means which inhibits the signal manifesting said last occurring interval from being stored as the signal manifesting the duration of said last occurring normal interval for the interval then occurring and for the immediate following interval.

3. The invention according to claim 1 wherein said control means and storing means includes digital circuitry.

4. The invention according to claim 1: wherein said system means includes
  A. signal providing means for providing a first timing signal in response to said beat signal, a second timing signal after said first timing signal, a first frequency signal having a first frequency and a second frequency signal having a second frequency, said second frequency being said certain percentage of said first frequency;
  B. first and second counter means responsive to said first and second frequency signals respectively;
  C. memory means, which on command of said second timing signal and a store signal, stores the then-existing count of said second counter;
  D. count comparing means, which on command of said first timing signal, provides a signal whenever the count stored by said memory exceeds the count of said first counter; and
  E. control signal means for providing said store signal as long as said count comparing means signal is not provided.

5. The invention according to claim 4 wherein said signal providing means further provides a third timing signal to each of said first and second counter means to reset said first and second counter means to an initial count, said third timing signal occurring subsequent to the occurrence of said second timing signal.

6. The invention according to claim 4 wherein said control signal means includes means responsive to the provision of said count comparing means signal for inhibiting the provision of said store signal following both the second timing signal which caused said count comparing means signal to be provided and the next occurring second timing signal.

7. The invention according to claim 4 wherein said second frequency is less than said first frequency.

8. The invention according to claim 4 wherein said system further includes second and third count comparing means, each being responsive to the count of said first counter and said first timing signal, for providing signals indicating whether the count of said first counter is respectively either above a high count or below a low count.

9. The invention according to claim 8 further including third and fourth counters wherein each of said provided second and third count comparing means signals are applied to a respective one of the third and fourth counters which respectively provide signals after a certain number of second and third count comparing means signals are applied thereto, said certain number being unique to each of said third and fourth counters.

10. A portable heart monitoring system for monitoring the occurrence of an arrhythmia, including an extrasystole, in the heartbeat of a subject comprising:
  A. means for providing a heartbeat pulse each time a heartbeat R wave occurs;
  B. means for providing a first periodic signal at a first frequency and a second periodic signal at a second frequency which is a preselected percent of said first frequency, said preselected percent being related to the ratio of the longest interval between a normal heartbeat and an extrasystole and the interval between two successive normal heartbeats;
  C. first and second resettable counter means which are reset to an initial count following the provision of each heartbeat pulse on command of a reset signal and which are respectively responsive to said first and second periodic signals, each counter means incrementing the count therein once for each cycle of the periodic signal applied thereto;
  D. memory means which, on command, of a store control signal, stores the then-existing count of said second counter means;
  E. comparing means responsive to the command of a compare control signal, which occurs prior to said store control signal, and further responsive to the counts of said first counter means and said memory means for providing an extrasystole signal whenever the count of said memory means exceeds the count of said first counter means; and
  F. control means for providing said compared control signal after the provision of each heartbeat pulse, for providing said store control signal after the provision of said compare control signal as long as said extrasystole signal has not occurred, and for providing said reset signal after the expected time of provision of said compare control signal, whether provided or not.

11. The invention according to claim 10 wherein said control means includes means responsive to said extrasystole signal for preventing said store control signal from being provided until after the provision of the heartbeat pulse subsequent to the one which caused said extrasystole signal to be provided.

12. The invention according to claim 11 wherein said system further includes means for determining the rate of extrasystoles and when said rate exceeds a given rate and display and alarm means responsive to said determining means for displaying the rate of extrasystoles and for sounding an audible alarm whenever said rate exceeds said given rate.

13. The invention according to claim 12 wherein said system further includes means for determining whether said heartbeat rate is greater than a first given rate or less than a second given rate and for providing signals to be said display and alarm means to cause a display indication and alarm indication whenever said heartbeat rate is greater than said first given rate or less than said second given rate.

14. A method of detecting irregularities in a sensed heartbeat signal, in which each beat thereof is detected whereby two successive beats form an interval, said method comprising the steps of:
  A. storing a first value related to the time interval between the last two beats and on command, storing a second value related to a previously stored first value which related to a normal time interval between beats;
  B. comparing said first and second values to determine whether the time interval between said last two beats is at least a certain percentage of said normal time interval;
  C. commanding said second value to be stored in the event the interval between said last two beats is within said certain percentage; and
  D. maintaining the previously stored second value until after the next two beats have occurred in the event the interval between said last two beats is not within said certain percentage.

15. A method of detecting the presence of an extrasystole in a sensed heartbeat signal in which each heartbeat thereof is detected comprising the steps of:
  A. counting from a reset value to a first value at a first rate between successive detected heartbeats;
  B. counting from a reset value to a second value at a second rate between successive heartbeats, said second rate being less than said first rate by an amount related to the ratio of the longest time between a normal heartbeat and an extrasystole and the time between two successive heartbeats;
  C. storing the second value previously obtained which relates to the count between a pair of successively detected heartbeats other than the most recent pair;
  D. determining after each heartbeat whether said first value is greater than said stored second value; and
  E. storing said second value lastly obtained which relates to the count between the most recent pair of detected heartbeats in place of said previously stored second value only in the event said first value was determined to be greater than said stored second value.

16. The method according to claim 15 further including the step of inhibiting the storage of the second value related to the count between the next pair of heartbeats detected in the event said first value is determined to not be greater than said stored second value.

* * * * *